United States Patent Office 3,705,905
Patented Dec. 12, 1972

---

3,705,905
6,7-DIHYDRO-5H-PYRROLIZINES AND METHOD OF PREPARATION
Claude Charles Joseph Culvenor, Mitcham, Victoria, John Alexander Edgar, Blackburn, Victoria, Leslie Walter Smith, Mitcham, Victoria, Helen Joan Tweeddale, East Kew, Victoria, Marjorie Vivienne Jago, Blackburn, Victoria, and Eric Lancelot French, Mount Eliza, Victoria, Australia, assignors to Commonwealth Scientific and Industrial Research Organisation, East Melbourne, Victoria, Australia
No Drawing. Filed Aug. 8, 1969, Ser. No. 848,711
Claims priority, application Australia, Aug. 8, 1968, 41,864/68
Int. Cl. C07d 27/28
U.S. Cl. 260—326.5 R    8 Claims

ABSTRACT OF THE DISCLOSURE

The invention provides new compounds having anti-viral, anti-tumour or immunosuppressive activity having the general formula

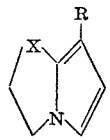

wherein X represents a methylene, α-hydroxymethylene, β-hydroxymethylene or carbonyl group and R represents a hydroxymethyl or formyl group. It also provides a method for the preparation of these compounds from heliotridine, retronecine or supinidine by oxidation followed, if desired, by reduction.

---

This invention relates to new compounds which have anti-viral, anti-tumour or immunosuppressive activity, to methods for the synthesis of such compounds and to pharmaceutical and veterinary compositions containing them. The invention also relates to methods of treating animals by administration of the compounds of the invention or compositions containing such compounds.

The new compounds with which this invention is concerned have the general formula I

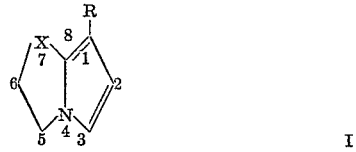

wherein X represents a methylene (—CH$_2$—), α-hydroxymethylene

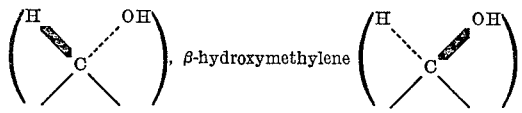, β-hydroxymethylene or carbonyl

group and R represents a hydroxymethyl (—CH$_2$OH) or formyl (—CH=O) group.

It will be understood that the general class to which the compounds of general Formula I relate can be referred to as 6,7-dihydro-5H-pyrrolizines.

In a preferred instance, this invention relates to compounds of the general Formula I above, in which R represents hydroxymethyl and X represents methylene, α-hydroxymethylene or β-hydroxymethylene.

Specific compounds with which this invention is particularly concerned, and which have been found to possess valuable anti-viral, anti-tumour or immunosuppressive activity, are the compounds:

6,7-dihydro-7α-hydroxy-1-hydroxymethyl-5H-pyrrolizine.
 (Dehydroheliotridine or 1-hydroxymethyl-7α-hydroxy-dihydro (5H) pyrrolizine.)
6,7-dihydro-7β-hydroxy-1-hydroxymethyl-5H-pyrrolizine.
 (Dehydroretronecine or 1-hydroxymethyl-7β-hydroxy-dihydro (5H) pyrrolizine.)
6,7-dihydro-1-hydroxymethyl-5H-pyrrolizine. (Dehydrosupinidine or 1-hydroxymethyl-dihydro (5H) pyrrolizine.)

(The names given in brackets are alternative names for the compounds listed.)

As mentioned above, the compounds dehydroheliotridine, dehydroretronecine and dehydrosupinidine have been found to possess valuable anti-viral, anti-tumour or immunosuppressive activity. In particular, dehydroheliotridine has been found to inhibit reproduction of infectious bovine rhinotracheitis (IBR) virus when added to bovine kidney cell culture before inoculation with virus. Inhibition also occurs if the virus is exposed to the compound, before or after inoculation of the kidney cells with the virus. This is indicative of a direct action of dehydroheliotridine on the preformed virus. On the other hand, experiments with the RNA viruses para-influenza (PI$_3$), Newcastle disease (NDV) and mucosal disease, and with bacteriophage T$_2$, indicate that the inhibitory activity is apparently restricted to DNA viruses. Furthermore, dehydroheliotridine has been found to be active against the Ehrlich ascites (EA) (intraperitoneal in mice), Walker carcinosarcoma 256 (subcutaneous in mice), lymphoid leukemia L-1210 (LE) (intraperitoneal in mice)) and lymphocytic leukemia P-388 (PA) (intraperitoneal in mice) tumour systems, and to be weakly active against the epidermoid carcinoma of the nasopharynx (KB) (Cell Culture) system. In addition, dehydroheliotridine is an active immunosuppressive agent when tested in mice and when given before the injection of antigen.

Compounds of general Formula I other than the three compounds mentioned in the preceding paragraph have shown, at the most, only weak anti-viral, anti-tumour or immunosuppressive activity. However, they are valuable intermediates in the preparation of the more active compounds of the invention.

The invention also includes methods for the preparation of the above compounds. In accordance with this aspect of the invention, compounds of the general Formula I above are prepared by oxidizing a compound of general Formula II

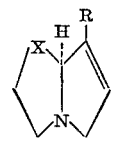

wherein X represents a methylene (—CH$_2$—), α-hydroxymethylene

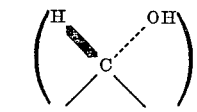 or β-hydroxymethylene 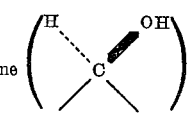

group and R represents a hydroxymethyl (—CH$_2$OH) group and, when it is desired to obtain a compound of the general Formula I in which is α- or β-hydroxymethylene and/or R is hydroxymethyl, reducing the oxidation product.

It has also been found that higher yields of the oxidised product may be obtained if the N-oxide of a compound of general Formula II above is used as a starting material.

The compounds of the general Formula II comprise the known compounds heliotridine (where X represents α-hydroxymethylene), retronecine (where X represents β-hydroxymethylene) and supinidine (where X represents methylene). These starting materials are known alkaloid derivatives, heliotridine being obtained by hydrolysis of the alkaloids heliotrine or lasiocarpine (from *Heliotropium europaeum*), retronecine by hydrolysis of monocrotaline (from *Crotalaria retusa* or *Crotalaria spectabilis*) or spectabiline (from *Crotalaria spectabilis*), and supinidine by hydrolysis of supinine (from *Heliotropium supinum*).

The oxidation of the compounds of general Formula II may be carried out by standard procedures, for example, using known dehydrogenation catalysts such as Adam's platinum oxide catalyst, or by oxidation under mild conditions using an oxidant such as manganese dioxide, potassium permanganate, silver oxide, chloranil, ninhydrin or mercuric acetate. Preferably the oxidant used is chloranil. Similarly, the reduction of the oxidation product may be carried out using standard procedures. In particular, alkali metal borohydrides, preferably sodium borohydride, may be used. Usually both the oxidation and the reduction steps can be carried out at room temperature.

The amounts of oxidant or reductant used will vary depending on the nature of the oxidant or reductant and of the starting material. The oxidant may be used in amounts ranging from equimolar with the starting material to a large molar excess, chloranil is preferably used in an equimolar amount while manganese dioxide is preferably used in a large molar excess of 20 molar or more. Similarly the reductant may be used in varying amounts, and it is preferred to use a 2 molar or larger amount of sodium borohydride.

The compounds of this invention which have anti-viral, anti-tumour or immunosuppressive activity may be used in veterinary medicine, either alone or in the form of pharmaceutical or veterinary compositions. In the formulation of such compositions, the compound may be combined with one or more known physiologically acceptable, organic or inorganic adjuvants or carriers.

This invention also provides methods for the treatment of viral infections, the suppression or control of immune responses or the groups of tumours, or for other diseases or disorders which require anti-viral, anti-tumour or immunosuppressive therapy. Such methods comprise the administration of the compounds of the invention, either alone or in the form of a pharmaceutical or veterinary composition.

In particular, in the treatment of viral infections, the compounds of the invention may be applied topically in a suitable medium or administered by injection as a solution or suspension of the compound in an isotonic medium. In the control of immune responses or of the growth of tumours, the compounds of the invention may be administered by injection of a solution or suspension of the compound in an isotonic medium, either intravenous, subcutaneous or directly into a tumour.

The methods of preparation and properties of the compounds of the invention are illustrated by the following examples which, however, are not to be construed as limiting the scope of the invention.

EXAMPLE 1

Preparation of dehydroheliotridine

A solution of heliotridine (930 mg.) in chloroform was treated with a solution of chloranil (1.47 g.) in chloroform (350 ml.) and the mixture was allowed to stand at room temperature for 1 hr. A saturated aqueous solution of potassium carbonate (40 ml.) was then added with stirring followed by the addition of solid lead carbonate (10 g.). After stirring for 45 min. the green gelatinous precipitate and the insoluble lead carbonate were removed by filtration through Celite and washed with fresh chloroform (50 ml.). The aqueous layer of the filtrate was separated and further extracted with chloroform (4× 50 ml.). The combined chloroform solution was then treated with aqueous sodium borohydride (1.0 g. in 50 ml.) and stirred vigorously for about 1 hr. The colourless chloroform layer was separated and the aqueous phase saturated with potassium carbonate and extracted with fresh chloroform (4× 50 ml.). The combined chloroform extract was dried ($Na_2SO_4$) and on evaporation yielded an oil which readily solidified. Sublimation (70° C./<.001 mm.) and crystallisation from benzene gave dehydroheliotridine (310 mg.) as colourless plates, M.P. 91–92° C., $[\alpha]_D^{20}+27.65°$ (ethanol). Found (percent): C, 62.7; H, 7.3; N, 9.2. $C_8H_{11}NO_2$ requires (percent): C, 62.7; H, 7.2; N, 9.1. Dehydroheliotridine shows a parent ion $m/e$ 153 in the mass spectrometer and has the following N.M.R. absorption: a 2-H singlet, $\delta$ 4.5 ($CH_2OH$), a 1-H multiplet, $\delta$ 5.10 (CHOH) and two 1-H doublets, $\delta$ 6.15, 6.50 (J. 3 c./s.) (pyrrole protons).

EXAMPLE 2

Preparation of 6,7-dihydro-7α-hydroxy-1-formyl-5H-pyrrolizine and 6,7-dihydro-7α-hydroxy-1-hydroxymethyl-5H-pyrrolizine (dehydroheliotridine)

(a) 6,7-dihydro-7α-hydroxy-1-formyl-5H-pyrrolizine.— A solution of heliotridine (0.536 g.) in chloroform (20 ml.) was treated with manganese dioxide (6 g.) and the mixture stirred at room temperature for about 6 hours or until thin layer chromatography (T.L.C.) indicated the absence of starting material. The reaction mixture was then filtered through kieselguhr and the filtrate evaporated to dryness. The pale yellow oil (0.419 g.) obtained consisted mainly of 6,7-dihydro-7α-hydroxy-1-formyl-5H-pyrrolizine but also contained small quantities of dehydroheliotridine, the keto-aldehyde (I, X=CO, R=CHO) and ring-opened compounds. The crude product may be purified by chromatography on a short neutral alumina column. The column separation is facilitated by continuing the manganese dioxide oxidation until the keto aldehyde is the only major impurity. 6,7-dihydro-7α-hydroxy-1-formyl-5H-pyrrolizine yields a parent ion $m/e$ 151 in the mass spectrometer and has the following N.M.R. absorption: a 1-H singlet, $\delta$ 9.2 (CHO); a 1-H multiplet, $\delta$ 5.4 (CHOH) and a 2-H multiplet, $\alpha$ 6.6 (pyrrolic protons).

(b) 6,7-dihydro-7α-hydroxy-1-hydroxymethyl-5H-pyrrolizine (dehydroheliotridine).—2.039 g. of crude 6,7-dihydro-7α-hydroxy-1-formyl-5H-pyrrolizine (above) was suspended in water (ca. 5 ml.) and a large excess of sodium borohydride was added in small quantities. The reduction mixture was kept at room temperature for about 2 hours with occasional agitation and the yellow oil slowly dissolved. After T.L.C. had indicated complete reduction, the aqueous solution was saturated with potassium carbonate and extracted with chloroform. The dried ($Na_2SO_4$) extract was then evaporated to dryness and yielded an almost colourless oil (1.974 g.) which was composed of dehydroheliotridine (70%) and a ring-opened compound (30%). Trituration with acetone afforded dehydroheliotridine as a colourless solid (371 mg.) M.P. 89–91°. The dehydroheliotridine remaining in the acetone could be separated from the impurity by chromatography on alkaline alumina although this resulted in considerable loss. Contamination by the ring-opened compound could be reduced by performing the initial oxidation on heliotridine N-oxide in methanol, when the final cruded dehydroheliotridine contained only 5 to 10% impurity. Treatment of the crude 6,7-dihydro-7α-hydroxy-1-formyl-5H-pyrrolizine with concentrated aqueous po-

EXAMPLE 3

Preparation of 6,7-dihydro-1-formyl-5H-pyrrolizine and 6,7-dihydro-1-hydroxymethyl-5H-pyrrolizine (dehydrosupinidine)

(a) 6,7-dihydro-1-formyl-5H-pyrrolizine.—A suspension of Adam's hydrated platinum oxide catalyst (0.05 g.) in water (2 ml.) was reduced, the water evaporated under vacuum and the dried catalyst exposed to air for 30 seconds. A solution of supindine (1.00 g.) in water (10 ml.) was added to the catalyst and the reaction flask was immediately evacuated, shaken mechanically for a few hours and allowed to stand for four days. The catalyst was then filtered off and the filtrate neutralised via dilute sulphuric acid and extracted with chloroform to give the crude aldehyde (0.21 g.). The aldehyde was purified by passage through a neutral alumina column and elution with benzene. The benzene fraction, after evaporation to dryness, was extracted with light petroleum (B.P. 40–60°), the solution concentrated and the aldehyde allowed to crystallise. After further recrystallisations from light petroleum, white crystals M.P. 59–60° were obtained. Found (percent): C, 70.71; H, 6.83; N, 10.27. $C_8H_9NO$ requires (percent): C, 71.11; H, 6.67; N, 10.37. 6,7-dihydro-1-formyl-5H-pyrrolizine showed a parent peak at $m/e$ 135 in its mass spectrum. The base peak occurred at $m/e$ 134 and a prominent peak at $m/e$ 106, corresponding to loss of CO from the $m/e$ 134 fragment was present. The N.M.R. spectrum in deuterochloroform showed a 1–H singlet at $\delta$ 9.76 (aldehyde proton) and a 2–H singlet at $\delta$ 6.58 (pyrrole protons). The deuterobenzene N.M.R. spectrum showed a 1–H singlet at $\delta$ 9.97 (aldehyde proton) and doublets at $\delta$ 6.10, 6.65 (J. 3 c.p.s.) (pyrrole protons).

(b) 6,7-dihydro-1-hydroxymethyl-5H-pyrrolizine (dehydrosupinidine). An aqueous ethanolic solution of the aldehyde obtained as above (87 mg., 0.00064 mol.) was added to an aqueous solution of sodium borohydride (48 mg., 0.00128 mol.). The solution was stirred mechanically for one hour and allowed to stand overnight. Potassium carbonate (3 g.) was then added and the solution extracted with ether in a separating funnel. The ether extracts were dried over sodium sulphate and evaporated to dryness to yield the virtually pure alcohol (76 mg.). 6,7-dihydro-1-hydroxymethyl-5H-pyrrolizine did not show a parent peak in its mass spectrum. The N.M.R. spectrum in deuterochloroform showed a 1–H singlet, which disappeared on $D_2O$ exchange, at $\delta$ 1.59 (hydroxyl proton), at 2–H singlet at $\delta$ 4.45 (9-methylene) and doublets at $\delta$ 6.17, 6.51 (J. 2.4 c.p.s.) (pyrrole protons).

EXAMPLE 4

Preparation of 6,7-dihydro-7β-hydroxy-1-hydroxymethyl-5H-pyrrolizine (dehydroretronecine)

Application of the same procedure as set out in Example 1 above to retronecine (930 mg.) yielded purified deyhdroretronecine (600 mg.), M.P. 91.5–93.5° C., $[\alpha]_D^{20}$ —28.4° (ethanol). The N.M.R. and mass spectra were identical with those obtained for dehydroheliotridine.

EXAMPLE 5

Antiviral activity tests

The viruses used were a DNA virus, VI55 strain of infectious bovine rhinotracheitis virus (IBR) which belongs to the herpes group and an RNA virus viz. PZL strain of *Myxovirus parainfluenza* type 3 (PZL, $PI_3$). Both of these viruses grow and produce a cytophthaic effect in Bovine Kidney (BK) cells in tissue culture. Dilutions of the pyrrole were incubated with 10 BK tubes. Twenty-four hours later, 100 $TCID_{50}$ (tissue culture infective doses 50% i.e. 100 times the amount of virus to infect 50% of a number of tissue tubes) were added. VI55 virus was added to 4 tubes. PZL was added to 4, and 2 were kept as toxicity controls. After allowing the virus to grow for 6 days, replicate tubes are pooled, tenfold dilutions made to titrate the yield of infective virus. By this method the titration result is actually that of the tube with the highest titre.

SCREENING RESULTS

| Compound | Concentration μg./ml.) | Reduction in virus yield (log 10 $TCID_{50}$) | |
|---|---|---|---|
| | | IBR | $PI_3$ |
| Dehydroheliotridine | 100 | 6.5 | 1.0 |
| | 50 | 4.5 | 1.0 |
| | 25 | 4.0 | 0.5 |
| | 12.5 | 1.5 | 0 |
| | 6.25 | 1.5 | 0 |
| Dehydroretronecine | 100 | 5.25 | 0.6 |
| | 33.3 | 2.75 | 0.1 |
| | 11.1 | 1.0 | 0 |
| | 3.7 | 0.25 | −0.15 |
| | 1.2 | 0 | 0.1 |
| | 0 | | |
| Dehydrosupinidine | 100 | (¹) | ----- |
| | 50 | 6.0 | 5.0 |
| | 25 | (²) | 4.25 |
| | 12.5 | 5.0 | 1.5 |
| | 6.25 | 0.4 | −0.1 |

¹ Toxic to cells.
² No results.

(Similar results were obtained with dehydroheliotridine when the compound was added at the same time as the virus or 24 hr. after the virus. Addition of dehydroheliotridine 72 hr. after the virus gave a reduction in yield of IBR virus of 3.5 $log_{10}$ $TCID_{50}$ whereas the yield of $PI_3$ virus was not affected.)

In another experiment, dehydroheliotridine was shown to inactivate IBR virus when incubated with the virus in the absence of host cells at a concentration of 84μg./ml. at 37° but not at 4°.

| Concentration (μ g./ml.) | Reduction in virus titre | |
|---|---|---|
| | 37° | 4° |
| 333 | 6.3 | 1.1 |
| 166 | 6.3 | 0.6 |
| 84 | 6.3 | 0.6 |
| 42 | 2.8 | 0.6 |
| 0 | 0 | 0 |

EXAMPLE 6

Anti-tumour activity tests (i) Ehrlich ascites (EA).—(a) Groups of 6 5-week old mice were injected i.p. with 1 ml. of a solution containing 1000 or 10,000 EA cells and 100 μg. test compound. Controls received EA cells without the compound. Observations were made at 2, 4 and 8 weeks after inoculation to ascertain tumour development. In controls, tumours were apparent at 2 weeks.

| Compound | Interval between mixing EA cells and compound, and inoculation (hr.) | Mice developing tumours |
|---|---|---|
| Dehydroheliotridine | 0 | 5/6 |
| | 1 | 2/6 |
| | 3 | 0/6 |
| Dehydroretronecine | 2 | 0/4 |
| Dehydrosupinidine | 3 | 0/6 |

(b) Groups of 6 5-week old mice were injected i.p. with 1 ml. of medium containing 1000 EA cells. After 24 hrs. the mice were given dehydroheliotridine 72 mg./kg., followed by further doses of 57 mg./kg. on the next 3 days. Controls, given saline, developed tumours in 5/6 at 1 month. No tumours developed in the treated mice.

(c) In another experiment, 1 single dose of dehydroheliotridine (100 mg./kg.; <½$LD_{50}$) was given to groups of 6 5-week old mice at varying periods after the tumour cells (10,000 cells).

| Days after tumour: | Mice developing tumours at 1 month |
|---|---|
| 0 | 0/6 |
| 3 | 0/6 |
| 6 | 0/6 |
| (Controls) | 5/6 |

(ii) Lymphoid leukemia L–1210; lymphocytic leukemia P–388 and KB cell culture.—These results were measured under the auspices of, and according to the protocol of, the Cancer Chemotherapy National Service Center Bethesda, Md., U.S.A. (Cancer Chemotherapy Reports 1962, No. 25).

For the leukemia L–1210 and P–388, activity is expressed as the increase in survival time. A test compound is active if percent survival time >125.

| Compound | Dose (mg./kg.) | Percent survival time L–1210 | P–388 |
|---|---|---|---|
| Dehydroheliotridine | 200 | 75 | |
| | 100 | 121 | 85 |
| | 50 | 153 | 133 |
| | 25 | 143 | 147 |

KB cell culture results are expressed as the $ED_{50}$, the concentration at which cell growth is reduced to 50% of control. Worthwhile activity is present if $ED_{50}<1$.

| | $ED_{50}$ (μg./ml.) |
|---|---|
| Dehydroheliotridine | 19. |
| Dehydrosupinidine | 1.9. |
| 6,7-dihydro-7-hydroxy-5H-pyrrolizine | 22. |
| 6,7-dihydro-1-formyl-5H-pyrrolizine | >100 (inactive). |
| Dehydroretronecine | Not tested. |

EXAMPLE 7

Immunosuppressive activity tests

The method used in this example was a modification of the Jerne plaque assay (Cunningham, A. J. and Fzenberg, A., Immunology, 1968, 14, 599) using sheep red cells as antigen. Dehydroheliotridine (100 mg./kg.) was administered before, simultaneously with and after the antigen. Counts of plaque forming cells (PFC) (geometric mean of 6 mice) were made at 5 days after antigen administration.

| Time of administering dehydroheliotridine | PFC/spleen | PFC/10⁶ spleen cells |
|---|---|---|
| 24 hours before antigen | 6,607 | 92 |
| Simultaneously with antigen | 19,720 | 199 |
| 24 hours after antigen | 548,300 | 4,954 |
| Control, no treatment | 338,100 | 2,682 |

What is claimed is:

1. Compound of the general Formula I:

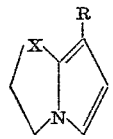

wherein X represents a member selected from the group consisting of a methylene group, an alpha-hydroxymethylene group, a beta-hydroxymethylene group, and a carbonyl group and R represents a member selected from the group consisting of a hydroxymethyl group and a formyl group.

2. The compounds of claim 1, wherein X represents a member selected from the group consisting of a methylene group, an alpha-hydroxymethylene group, and a beta-hydroxymethylene group and R represents a hydroxymethyl group.

3. A compound: 6,7-dihydro-7α-hydroxy-1-hydroxymethyl-5H-pyrrolizine.

4. A compound: 6,7-dihydro-7β-hydroxy-1-hydroxymethyl-5H-pyrrolizine.

5. A compound: 6,7-dihydro-1-hydroxymethyl-5H-pyrrolizine.

6. A method for the preparation of those compounds of claim 1, wherein X represents a methylene group and R represents a carbonyl group, which comprises oxidizing at room temperature, in the presence of a member selected from the group consisting of a conventional dehydrogenation catalyst and a conventional oxidizing agent, a compound of the Formula II

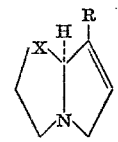

or the N-oxide thereof, said catalyst and said oxidizing agent being present in at least an equimolar amount to that of the compound of Formula II,
said conventional dehydrogenation catalyst being Adam's platinum oxide dehydrogenation catalyst and said conventional oxidizing agent being a member selected from the group consisting of manganese dioxide, potassium permanganate, silver oxide, chloranil, ninhydrin and mercuric acetate.

7. A method for the preparation of those compounds of claim 1, wherein X represents a member selected from the group consisting of an alpha-hydroxymethylene group and a beta-hydroxymethylene group and wherein R represents a hydroxymethyl group, which comprises oxidizing at room temperature, in the presence of a member selected from the group consisting of a conventional dehydrogenation catalyst and a conventional oxidizing agent, a compound of the Formula II:

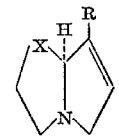

or the N-oxide thereof, and subsequently reducing the oxidation product thus obtained with an alkali metal borohydride, said catalyst, said oxidizing agent, and said alkali metal borohydride, being present in at least equimolar amount to the compound of Formula II,
said conventional dehydrogenation catalyst being Adam's platinum oxide dehydrogenation catalyst and said conventional oxidizing agent being a member selected from the group consisting of manganese dioxide, potassium permanganate, silver oxide, chloranil, ninhydrin and mercuric acetate.

8. The method of claim 7, wherein said alkali metal borohydride is sodium borohydride.

References Cited

Ponomarev et al., Chem. Abs. 60:15813 (1964).

NICHOLAS S. RIZZO, Primary Examiner

J. A. NARCAVAGE, Assistant Examiner

U.S. Cl. X.R.

260—326.5 J; 424—274